H. E. TRENT.
INDUCTION MOTOR WINDING.
APPLICATION FILED JULY 11, 1914.

1,316,004.

Patented Sept. 16, 1919.

WITNESSES:
A. J. Fitzgerald
J. C. Davis

INVENTOR
Harold E. Trent.
BY
Wesley G. Carr
ATTORNEY

UNITED STATES PATENT OFFICE.

HAROLD E. TRENT, OF HARPENDEN, ENGLAND, ASSIGNOR TO WESTINGHOUSE ELECTRIC AND MANUFACTURING COMPANY, A CORPORATION OF PENNSYLVANIA.

INDUCTION-MOTOR WINDING.

1,316,004.     Specification of Letters Patent.     Patented Sept. 16, 1919.

Application filed July 11, 1914. Serial No. 850,344.

*To all whom it may concern:*

Be it known that I, HAROLD E. TRENT, a subject of the King of Great Britain and a resident of Harpenden, Herts, England, have invented a new and useful Improvement in Induction-Motor Windings, of which the following is a specification.

My invention relates to windings for dynamo-electric machines and more specifically to windings of the "squirrel cage" type employed on the secondary members of induction motors, and it has for its object to provide a winding of the character specified which will be cheap and simple to manufacture and assemble and which will be rugged and efficient in construction and operation.

Figure 1:
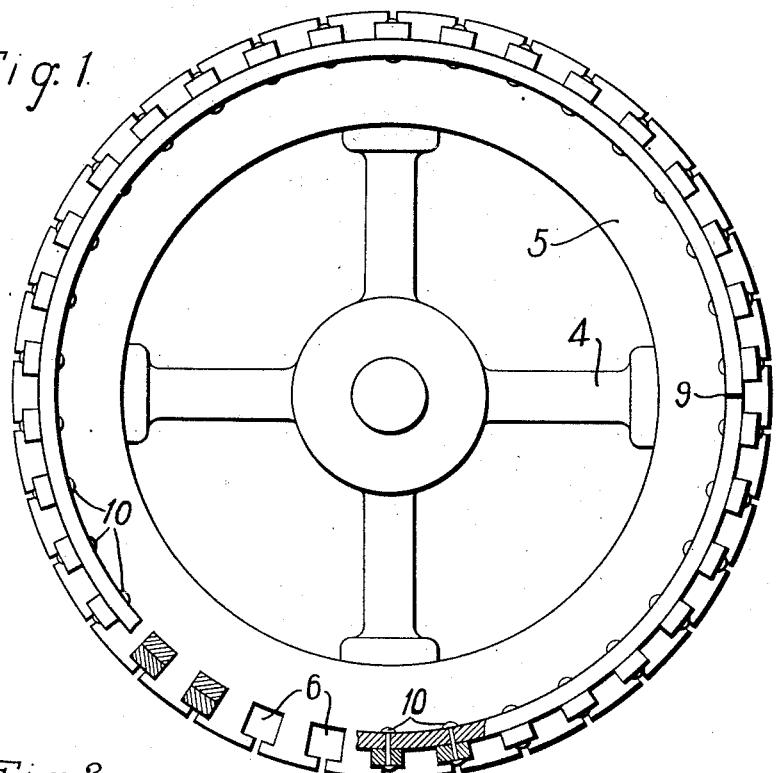
Figure 2:
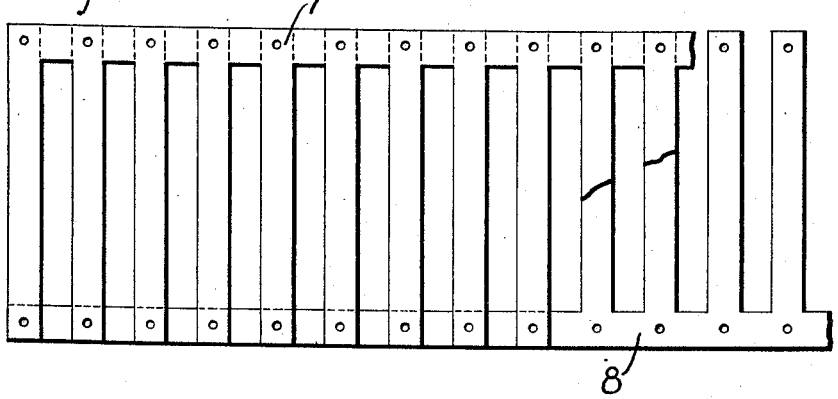
Figure 3:
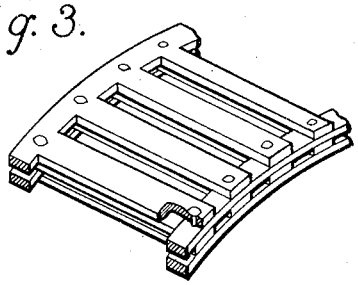

In the accompanying drawing, Figure 1 is an end view, partially in section and partially in elevation of the rotor of an induction motor embodying my invention; Fig. 2 is a development of the winding shown in Fig. 1; and Fig. 3 is a perspective view, partially in section and partially in elevation of a modification of the same winding.

In the construction of induction motors, it is essential for efficient operation, when operating near synchronous speeds, that the winding of the secondary member have an extremely low ohmic resistance. For this purpose there have been developed a great number of squirrel cage windings where the common object in view has been to provide a simple and rugged construction of extremely good conductivity and I attain this end in a novel manner.

Referring to the accompanying drawing, 4 is the spider of the secondary member of an induction motor provided with the usual laminated iron rim 5 having suitable slots 6 therein. A pair of comb shaped members 7 and 8 (Fig. 2), constructed preferably of copper or other good conducting material, are suitably curved to fit the rim 5 and the teeth thereof are inserted into the slots 6 in opposite directions so that the said teeth overlap throughout their entire length and the extremities of the teeth of one comb member overlie the back of the other comb member. The ends of the comb shaped members are fastened together by brazing or otherwise, as shown at 9, and the joints thereof are preferably staggered with respect to each other. The extremities of the teeth of each comb shaped member are suitably attached to the back of the other comb shaped member by rivets 10, as shown, or by any other suitable means. If desired, the teeth of the combs may be fastened together throughout their entire length as by soldering or by brazing.

By this construction, I am enabled to construct and assemble the secondary winding very easily and quickly, said winding is of great mechanical strength and high conductivity and well adapted in every way for the purposes to which it is to be applied.

If desired, in order to render the conductivity of the circumferential portions of the winding equal to that of the slotted portions thereof, I may apply an additional ring member outside of the teeth at each end of the core, fastening it to the winding by any suitable means.

It will be noted that the longitudinal expansion of the winding due to heat will have little or no effect thereupon since both members' at all contacting surfaces will be moved in a like degree.

If desired, I may duplicate the comb shaped members 7 and 8 introducing, for example, two of said members at each end of the core, thus forming a laminated winding of considerable flexibility and of high conductivity, as shown in Fig. 3.

While I have shown my invention in only two embodiments thereof, I do not desire to be restricted thereto but desire only such restrictions to be imposed thereupon as are set forth in the appended claims.

By designing a rotor member with teeth and slots of equal width, it is possible to form a pair of comb shaped members from a piece of copper without any waste because the teeth and the intervening spaces would then be of equal width.

I claim as my invention:

1. The combination with a slotted core member, the teeth and slots of which are of substantially equal width, of a winding therefor comprising two superposed comb shaped plates inserted into said slots from opposite ends thereof, the teeth on said plates being of substantially the same width as the intervening spaces, whereby the two comb-shaped plates may be cut from a piece of stock with no waste.

2. The combination with a slotted core member, of a winding therefor comprising a plurality of superposed comb shaped plates of conducting material, a portion of said plates being disposed with their teeth extending through said slots in one direction and protruding therefrom and the remainder being disposed with their teeth extending through said slots in the other direction and protruding therefrom, and means for rigidly attaching the protruding ends of the teeth of one set of plates to the backs of the other set of plates.

3. In combination with a slotted core, a plurality of elements of conductive material each comprising a body portion and a portion projecting from said body portion, said body portion being disposed at one end of said core and said projecting portion being disposed in a slot of said core and extending beyond the opposite end thereof, and the body portion of one element being electrically connected to the extending end of the projecting portion of another element.

4. A squirrel-cage winding comprising a plurality of elements of conductive material each comprising a body portion and a portion projecting from said body portion, the body portions of a plurality of said elements being spaced apart, and the body portion of one element being in overlapping relation with and electrically connected to the end of the projecting portion of another element.

5. A squirrel-cage winding comprising a plurality of superposed comb-shaped plates of conductive material arranged in two sets, each of said sets comprising a plurality of similarly formed sections comprising a body portion or back and teeth extending therefrom, the backs of the plates of one set being spaced from the backs of the plates of the other set and one set of said plates being arranged with their teeth extending in one direction and the other set being arranged with their teeth extending in the opposite direction, a plurality of teeth of plates of each set being superposed, and the ends of the teeth of plates of one set being in overlapping relation with the backs of plates of the other set and being rigidly attached thereto.

6. A squirrel-cage device comprising a plurality of superposed comb-shaped plates arranged in two sets, one set of said plates being arranged with their teeth extending in one direction and the other set being arranged with their teeth extending in the other direction, and the ends of the teeth of one set of plates being in overlapping relation with the backs of the plates of the other set, and means for rigidly attaching the ends of the teeth of one set of plates to the backs of the other set of plates.

7. A winding of the squirrel-cage type comprising a plurality of superposed comb-shaped plates arranged in two sets, each set including a plurality of similarly formed plates comprising a body portion or back and teeth extending therefrom, one set of said plates being arranged with their teeth extending in one direction and the other set being arranged with their teeth extending in the other direction, and the ends of the teeth of one set of plates being in overlapping relation with the backs of the plates of the other set and being rigidly attached thereto.

8. A closed-circuit winding including a plurality of elements each comprising a body portion and a portion projecting from said body portion, the body portions of two of said elements being spaced apart with their projecting portions extending in opposite directions, and the body portion of one of said elements and the end of the projecting portion of the other of said elements being in overlapping relation and connected together.

9. A winding of the squirrel-cage type comprising a plurality of plates each comprising a body portion and a projection or tooth extending therefrom said plates being arranged in two sets with the body portions of the plates of one set spaced apart from corresponding portions of the plates of the other set, and the ends of the teeth of plates of one set being in overlapping relation with the body portions of plates of the other set and connected thereto.

10. In a squirrel-cage device, a plurality of superposed comb-shaped plates each of which comprises a body portion or back and teeth extending therefrom, said plates having their body portions or backs spaced apart and the ends of teeth of one plate in overlapping relation with the body portion or back of another plate and connected thereto.

11. A squirrel-cage device comprising two sets of superposed toothed plates, each of said sets including a plurality of plates, and the end of a tooth of each plate of one set being in overlapping relation with the back or body portion of a plate of the other set.

In testimony whereof I have hereunto subscribed my name this 26th day of June, 1914.

HAROLD E. TRENT.

Witnesses:
 GEO. W. HANSEN,
 B. B. HINES.